(12) United States Patent
Burgett et al.

(10) Patent No.: US 9,151,401 B2
(45) Date of Patent: Oct. 6, 2015

(54) FAIL-SAFE APPARATUS FOR USE WITH FLUID VALVES

(71) Applicant: Tescom Corporation, Elk River, MN (US)

(72) Inventors: Eric Jacob Burgett, Maple Grove, MN (US); Brian J. Tutt, Brainerd, MN (US)

(73) Assignee: TESCOM CORPORATION, Elk River, MN (US)

( * ) Notice: Subject to any disclaimer, the term of this patent is extended or adjusted under 35 U.S.C. 154(b) by 337 days.

(21) Appl. No.: 13/718,664

(22) Filed: Dec. 18, 2012

(65) Prior Publication Data
US 2013/0168580 A1   Jul. 4, 2013

Related U.S. Application Data

(60) Provisional application No. 61/581,492, filed on Dec. 29, 2011.

(51) Int. Cl.
| | |
|---|---|
| *F16K 17/36* | (2006.01) |
| *F16K 31/124* | (2006.01) |
| *F16K 31/02* | (2006.01) |
| *F16K 31/122* | (2006.01) |
| *F16K 31/00* | (2006.01) |
| *F15B 15/24* | (2006.01) |
| *F16K 31/04* | (2006.01) |

(52) U.S. Cl.
CPC .................. *F16K 17/36* (2013.01); *F15B 15/24* (2013.01); *F16K 31/003* (2013.01); *F16K 31/02* (2013.01); *F16K 31/047* (2013.01); *F16K 31/124* (2013.01); *F16K 31/1221* (2013.01); *F16K 31/1225* (2013.01)

(58) Field of Classification Search
CPC ....... F16K 17/36; F16K 31/124; F16K 31/02; F16K 31/1225; F16K 31/047; F16K 31/1221; F16K 31/003; F15B 15/24
USPC .................................. 251/31, 68–77
See application file for complete search history.

(56) References Cited

U.S. PATENT DOCUMENTS 4,364,541 A * 12/1982 Chabat-Courrede et al. ... 251/54
4,895,341 A *  1/1990 Brown et al. ..................... 251/8
(Continued)

FOREIGN PATENT DOCUMENTS

GB           708582        5/1954

OTHER PUBLICATIONS

International Searching Authority, "International Search Report," issued in connection with International application No. PCT/US2012/071870, mailed Apr. 2, 2013, 2 pages.
(Continued)

*Primary Examiner* — Kevin Murphy
*Assistant Examiner* — Daphne M Barry
(74) *Attorney, Agent, or Firm* — Hanley, Flight & Zimmerman, LLC

(57) ABSTRACT

Fail-safe apparatus for use with fluid valves are disclosed herein. An example fail-safe apparatus includes a first piston, a second piston movably coupled relative to the first piston, and a fluid chamber between the first and second pistons to receive a control fluid. The control fluid is to operatively couple the first and second pistons when the control fluid is provided in the fluid chamber. The first piston is operatively decoupled from the second piston when at least some of the control fluid is removed from the fluid chamber.

21 Claims, 6 Drawing Sheets

(56) References Cited

U.S. PATENT DOCUMENTS

| | | | |
|---|---|---|---|
| 5,848,608 A * | 12/1998 | Ishigaki | 137/599.16 |
| 6,047,730 A * | 4/2000 | Coura et al. | 137/614.18 |
| 6,814,338 B2 * | 11/2004 | Kajitani | 251/63.6 |
| 8,985,137 B2 * | 3/2015 | Burgett et al. | 137/315.28 |
| 8,991,427 B2 * | 3/2015 | Larsen | 137/625.5 |
| 2003/0106424 A1 | 6/2003 | Sorze | |
| 2004/0238051 A1 | 12/2004 | Tranovich et al. | |
| 2005/0045839 A1 | 3/2005 | Kajitani | |
| 2013/0161145 A1 | 6/2013 | Froehlich et al. | |

OTHER PUBLICATIONS

International Searching Authority, "Written Opinion", issued in connection with International application No. PCT/US2012/071870, mailed Apr. 2, 2013, 7 pages.

Tescom, "Air Operated Valve VA/VG Series," instructions for use, Nov. 2006, 4 pages.

* cited by examiner

FAIL-SAFE APPARATUS FOR USE WITH FLUID VALVES

CROSS-SECTION TO RELATED APPLICATIONS

This patent claims the benefit of U.S. Provisional Patent Application 61/581,492, entitled Fail-Safe Apparatus for use with Fluid Valves, filed on Dec. 29, 2011, which is hereby incorporated herein by reference in its entirety.

FIELD OF THE DISCLOSURE

This patent relates generally to fluid valves and, more particularly, to fail-safe apparatus for use with fluid valves.

BACKGROUND

Process control systems use a variety of field devices to control and/or monitor process parameters. Field devices, such as air-operated on/off valves, employ a control fluid to move a flow control member relative to an orifice between an open position to allow fluid flow through the valve and a closed position to restrict or prevent fluid flow through the valve. However, such air-operated on/off valves lack precise control of fluid flow through the valve.

To precisely control the flow of fluid through a valve, the valve often employs an electric controller or actuator to actuate or move the flow control member relative to the orifice. However, during a fail condition (e.g., when electric power to the electric controller fails), an electric controller typically fails (i.e., holds) at its last control position. As a result, valves employing electric controllers or actuators often have a fail-safe system upstream from the valve that activates to prevent fluid flow to the valve during a fail condition. However, such fail-safe systems increase complexity, costs and consume additional space.

DETAILED DESCRIPTION

Example valve apparatus or assemblies disclosed herein employ an electric flow controller to precisely control the flow of fluid through a valve apparatus. Additionally, the example valve apparatus disclosed herein include a fail-safe apparatus to provide a fail-safe condition if power to the electric flow controller is lost. More specifically, the example fail-safe apparatus is integral with the valve apparatus. As a result, unlike some known air-operated valve apparatus, the example valve apparatus disclosed herein do not need a secondary valve upstream from the valve apparatus to provide a fail-safe mechanism.

An example fail-safe apparatus disclosed herein employs a connector or piston assembly having a first portion or piston movably or slidably coupled to a second portion or piston. Additionally, the piston assembly forms a chamber between the first and second portions of the piston assembly. The first portion of the piston assembly may be operatively coupled to an electric actuator and the second portion of the piston assembly may be coupled to a flow control member of a fluid valve. The example valve apparatus disclosed herein employ a control fluid (e.g., air, hydraulic oil, etc.) to operatively and/or selectively couple and decouple the flow control apparatus and the electric flow controller or actuator.

More specifically, the control fluid operatively and/or selectively couples the first and second portions of the piston assembly. In particular, when the chamber is pressurized with the control fluid, the control fluid imparts a force to the first and second portions to frictionally couple the first and second portions. However, when at least some of the control fluid is vented or removed (e.g., during a fail condition), the first portion of the piston is operatively decoupled from the second portion of the piston. As a result, the second portion of the piston, which is operatively coupled to the flow control member, is operatively decoupled from the electric flow controller. In turn, a fail-safe apparatus, actuator or biasing element operates the second portion of the piston assembly independent from the first portion of the piston assembly. In other words, the fail-safe apparatus operates the flow control member of the fluid valve instead of the electric actuator during a fail condition.

Figure 1:
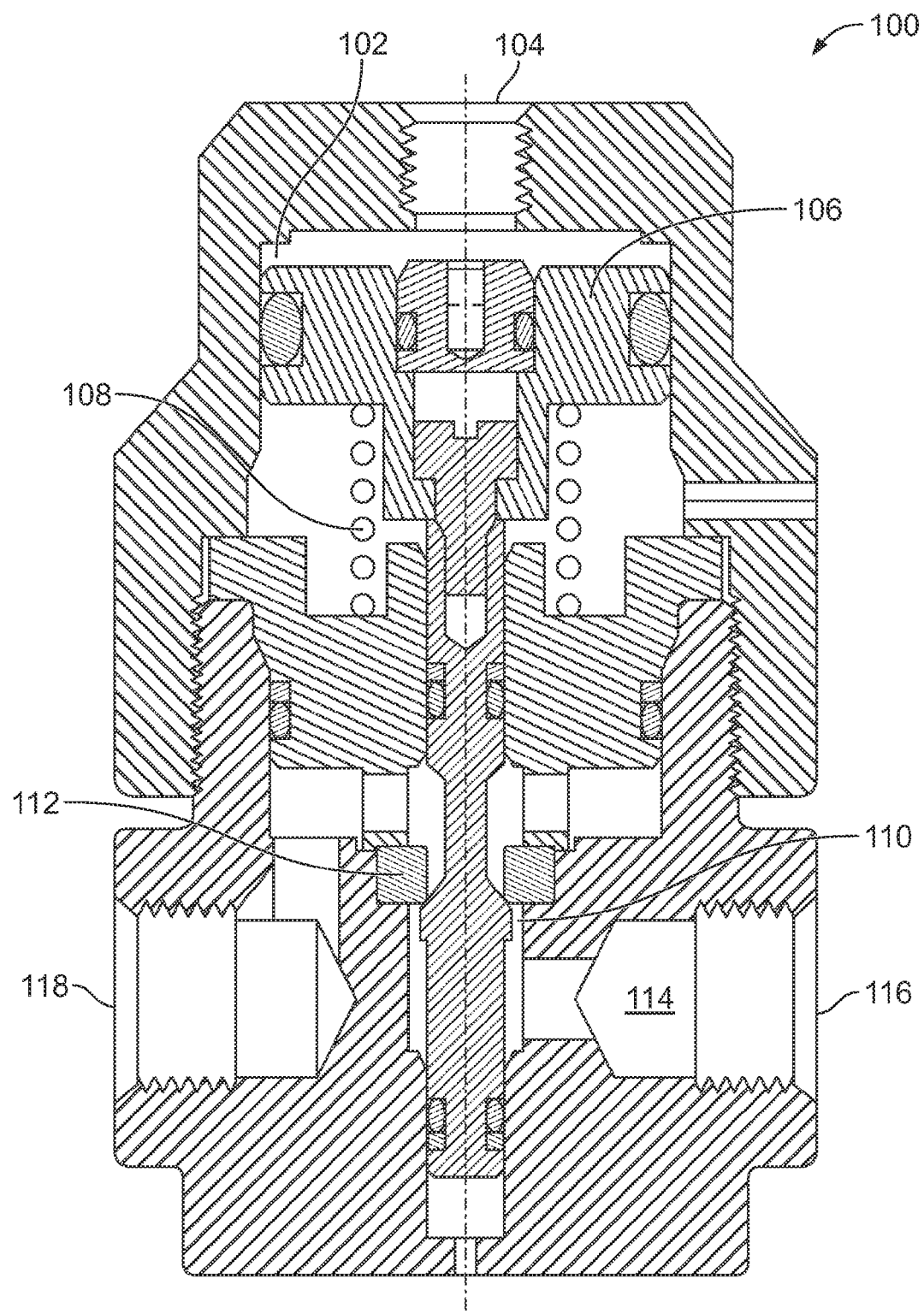
FIG. 1 is a cross-sectional view of a known fluid valve.

Before discussing the example valve apparatus described herein, a brief description of a known fluid valve 100 is provided in FIG. 1. In operation, a control pressure or fluid (e.g., air) is provided in a pressure chamber 102 via an input port 104. The control fluid imparts a force to a piston or actuator 106 to move the piston 106 toward a biasing element 108. In turn, a valve plug 110 coupled to the piston 106 moves away from a valve seat 112 to a fully open or maximum flow rate position to allow fluid flow through a passageway 114 between an inlet 116 and an outlet 118. When the control fluid is vented or removed from the pressure chamber 102, the biasing element 108 moves the piston 106 toward the pressure chamber 102 to cause the valve plug 110 to engage the valve seat 112 to restrict or prevent fluid flow through the passageway 114 (e.g., a closed position). Thus, the fluid valve 100 of FIG. 1 provides on/off fluid flow control.

Figure 2:
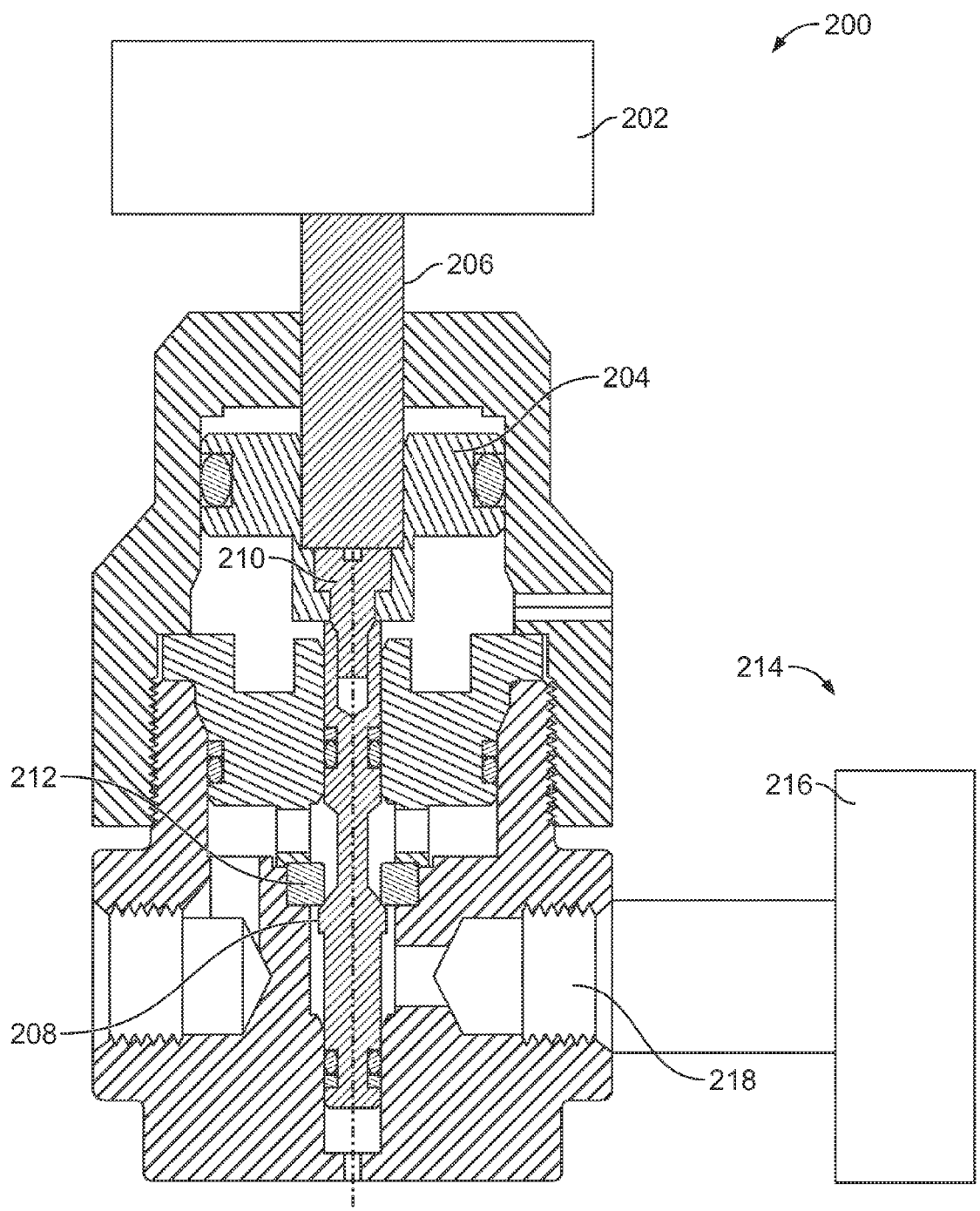
FIG. 2 is a cross-sectional view of another known fluid valve.

To provide precise or accurate fluid flow control, some known control valves employ an electric actuator or motor. For example, FIG. 2 illustrates an example fluid valve 200 implemented with an electric actuator 202. The electric actuator 202 is operatively coupled to a piston 204 via a stem 206 and the piston 204 is coupled to a valve plug 208 via a stem 210. During operation, the electric actuator 202 moves the piston 204 and, thus, the valve plug 208 relative to a valve seat 212 between a fully open position, a fully closed position and/or any intermediate positions between the fully open position and the fully closed position. However, during a fail condition (e.g., when electric power is not provided to the electric actuator 202), the valve plug 208 remains in the last control position. For example, during a fail condition, the fluid valve 200 may remain in the open position or an intermediate position between the fully closed position and the fully open position. To provide a fail-safe condition, the valve 200 employs a fail-safe system 214. The fail-safe system 214 typically includes a secondary valve 216 disposed upstream from an inlet 218 of the fluid valve 200 to prevent fluid flow to the fluid valve 200 during a fail condition. However, such example fail-safe systems 214 increase costs (e.g., manufacturing and installation costs), complexity and provides a relatively larger dimensional envelope.

Figure 3:
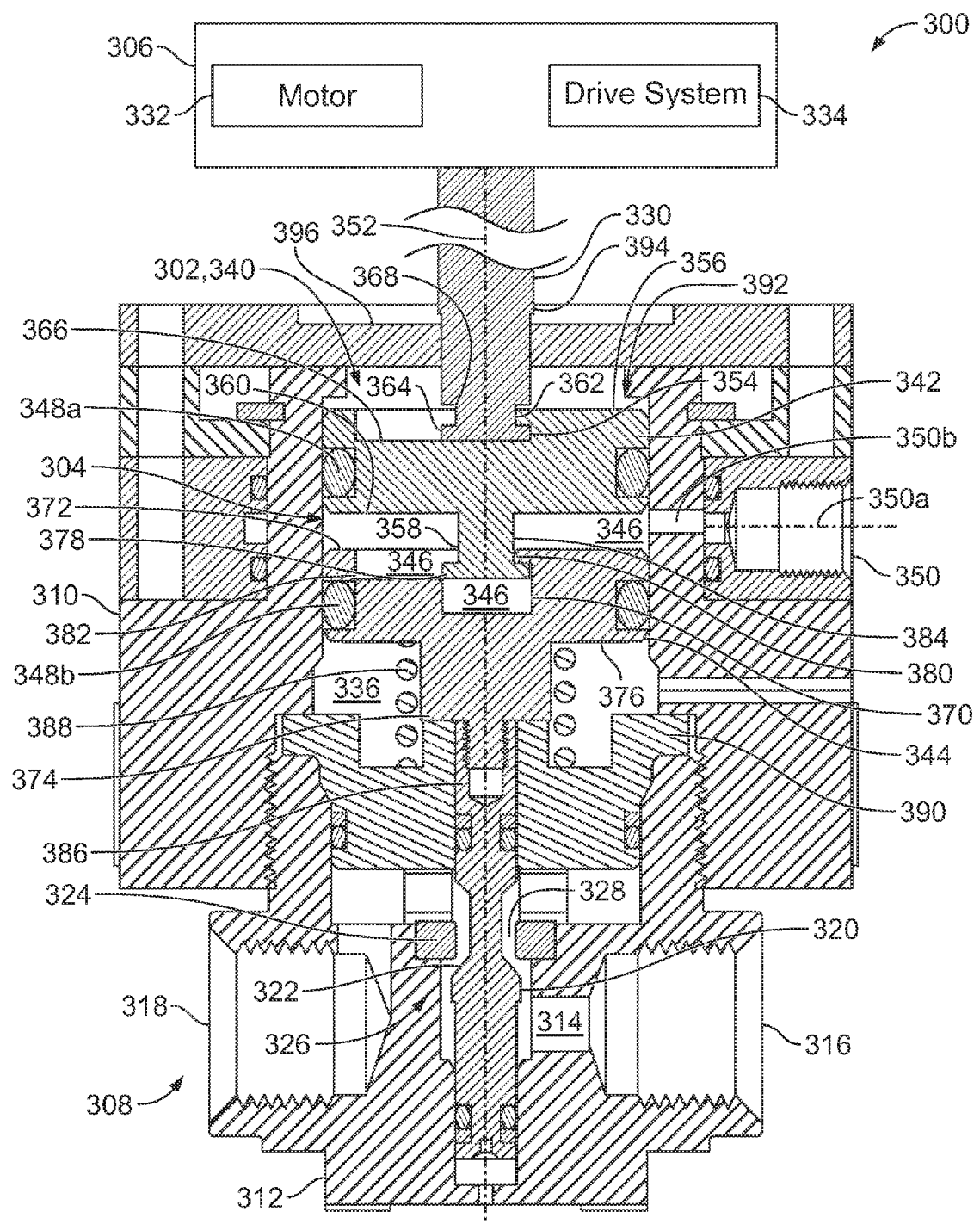
FIG. 3 is a cross-sectional view of an example control valve disclosed herein shown in a first position.

FIG. 3 illustrates an example control valve 300 that includes a flow control assembly or actuator connector assembly 302 implemented with a fail-safe system 304 in accordance with the teachings of this disclosure. The control valve 300 of FIG. 3 includes an electric flow controller or electric actuator 306 operatively coupled to a fluid valve 308 via a bonnet 310. The fluid valve 308 includes a valve body 312 that defines a fluid flow passageway 314 between an inlet 316 and an outlet 318. A flow control member 320 (e.g., a valve plug or poppet) is disposed within the fluid flow passageway 314 and includes a seating surface 322. The flow control member 320 moves relative to a valve seat 324 between a fully open position 326, a fully closed position and/or an intermediate position between the fully closed and the fully open positions (as shown in FIG. 3) to control fluid flow through a port area or orifice 328 defined between the inlet 316 and the outlet 318.

The electric actuator 306 of the illustrated example is operatively coupled to the flow control member 320 via a drive shaft or stem 330. The electric actuator 306 of the illustrated example includes a motor 332 that drives the stem 330 via a drive system or drive train 334. The motor 332 may be any motor such as, for example, an alternating current (AC) motor, a direct current (DC) motor, a variable frequency motor, a stepper motor, a servo motor, or any other suitable motor or drive member. The drive system 334 may include a plurality of gears (e.g. spur gears), a planetary gear system, or any other suitable gear and/or transmission to convert rotational motion of the motor 332 to rectilinear motion of the stem 330.

In the illustrated example, the actuator connector assembly 302 operatively and/or selectively couples the electric actuator 306 (e.g., the stem 330) and the flow control member 320. As shown in FIG. 3, the actuator connector assembly 302 is disposed in a cavity 336 of the bonnet 310. The example actuator connector assembly 302 of FIG. 3 includes a piston assembly 340. In particular, the piston assembly 340 of the illustrated example includes a first portion or piston 342 movably and/or slidably coupled to a second portion or piston 344. In particular, the first piston 342 may be operatively and/or selectively coupled to the second piston 344 to prevent movement of the second piston 344 relative to the first piston 342. To operatively and/or selectively couple the first and second pistons 342 and 344, a fluid chamber 346 is formed or provided between the first and second pistons 342 and 344. More specifically, a volumetric capacity of the fluid chamber 346 between the first and second pistons 342 and 344 varies (e.g., increases or decreases) when the second piston 344 slides relative to the first piston 342. The first piston 342 includes a first seal 348a (e.g., an O-ring) and the second piston 344 includes a second seal 348b (e.g., an O-ring) to provide a tight seal between the fluid chamber 346 and the cavity 336 of the bonnet 310. The bonnet 310 of the illustrated example includes a fluid port 350 in fluid communication with the fluid chamber 346. In particular, a central axis 350a of the fluid port 350 is substantially perpendicular to a longitudinal or central axis 352 of the first piston 342 and/or the second piston 344. In other examples, the fluid port 350 can be at a non-perpendicular angle relative to the longitudinal axis 352 and/or any other position or orientation. The fluid port 350 and an opening 350b in the bonnet 310 provide a fluid flow path to the fluid chamber 346.

The first piston 342 of the illustrated example includes an opening or bore 354 formed in a first surface or face 356 of the first piston 342 and a stem 358 protruding from a second surface or face 360 of the first piston 342. In the illustrated example, the first surface 356 is opposite the second surface 360. More specifically, the first surface 356 of the first piston 342 is oriented in a direction to face the stem 330 and the second surface 360 of the first piston 342 is in fluid communication with the fluid chamber 346. The opening 354 of the first piston 342 receives or couples the stem 330 of the electric actuator 306 and the piston assembly 340. As shown in FIG. 3, the opening 354 forms a shoulder, flange or protrusion 362 to engage (e.g., frictionally engage) a flanged or stepped portion 364 of the stem 330. In particular, the shoulder 362 of the opening 354 extends along a portion of a perimeter of the opening 354. Further, the flanged portion 364 and/or an annular groove or channel 368 may extend along a portion of a perimeter of the stem 330. To enable coupling of the stem 330 and the opening 354 of the first piston 342, the first surface 356 of the first piston 342 includes a slot or keyed opening 366 to enable the flanged portion 364 of the stem 330 to be disposed in the opening 354 without interference from the shoulder 362.

The stem 330 includes the groove or annular channel 368 to receive the shoulder 362 of the opening 354 to couple the stem 330 and the first piston 342. In other words, the annular groove 368 captures the shoulder 362 of the opening 354 with a relatively tight fit connection to reduce or eliminate axial play between the first piston 342 and the stem 330 in a direction along the axis 352. In other examples, the stem 330 may be coupled to the first piston 342 via threads, fasteners, pins and/or any other suitable fastening mechanism(s). During assembly, the stem 330 may first be placed in the keyed opening 366 and slid in a direction substantially perpendicular to the axis 352 of the first piston 342 until the shoulder 362 engages the annular groove 368.

The second piston 344 of the illustrated example includes an opening or bore 370 formed in a first surface or face 372 of the second piston 344 and a stem 374 protruding from a second surface or face 376 of the second piston 344. In the illustrated example, the first surface 372 of the second piston 344 is opposite the second surface 376 such that the first surface 372 of the second piston 344 is in fluid communication with the fluid chamber 346 and the second surface 376 of the second piston 344 is oriented in a direction to face the flow control member 320. The stem 358 of the first piston 342 is coupled to the second piston 344 via the opening 370. In particular, the stem 358 of the first piston 342 includes a flange, lip or protruding member 378 to engage a lip or shoulder 380 formed in the opening 370 of the second piston 344 when the first piston 342 is coupled to the second piston 344. The first surface 372 of the second piston 344 includes a slot or keyed opening 382 to enable the flange 378 of the stem 358 of the first piston 342 to be disposed in the opening 370 of the second piston 344 without interference from the shoulder 380 of the opening 370. The slot or keyed opening 382 may extend along a portion of the first surface 372 and/or the shoulder may extend along a portion of a circumference of the opening 370.

The stem 358 of the first piston 342 includes a groove or annular channel 384 (e.g., an elongated groove or channel) to receive or slidably engage the shoulder 380 of the opening 370 of the second piston 344. In particular, the shoulder 380 of the opening 370 of the second piston 344 moves along the annular channel 384 to enable movement of the second piston 344 relative to the first piston 342 in a direction parallel to the axis 352 when the second piston 344 is operatively decoupled from the first piston 342 as described in greater detail below. In the illustrated example, a length or height of the annular channel 384 and/or a depth of the opening 370 of the second piston 344 are at least equal to a full stroke length of the electric actuator 306 to enable the second piston 344 to move relative to the first piston 342 from a fully open position to a fully closed position when the second piston 344 is operatively decoupled from the first piston 342.

The stem 374 of the second piston 344 is coupled (e.g., threadably coupled) to the flow control member 320. Thus, as shown in FIG. 3, the first piston 342 is coupled to the electric actuator 306 via the stem 330 and the second piston 344 is coupled to the flow control member 320 via a stem 386. The actuator connector assembly 302 includes a biasing element 388 to move the second piston 344 independently relative to the first piston 342 when the first piston 342 is operatively decoupled from the second piston 344 (e.g., during a fail condition). The biasing element 388 is disposed between the second surface 376 of the second piston 344 and a spring seat 390 (e.g., a valve guide or insert). The biasing element 388 biases the second piston 344 toward the first piston 342, but does not interfere with the operation of the electric actuator 306 when the first piston 342 is operatively coupled to the second piston 344.

In other words, when the fluid chamber 346 receives pressurized control fluid, a force imparted to the face 376 of the second piston 344 by the biasing element 388 is less than a force provided by the control fluid to the first face 372 of the second piston 344 and, thus, is not sufficient to overcome the force imparted to the face 372 of the second piston 344 by the control fluid. As a result, the second piston 344 does not move relative to the first piston 342. As a result, when the electric actuator 306 overcomes the force provided by the biasing element 388, the motor 332 can cause (e.g., pull) the first and second pistons 342 and 344 to move together as a unitary piece or structure.

To operatively and/or selectively couple the first piston 342 and the second piston 344, a control fluid (e.g., pressurized air, hydraulic oil, etc.) is provided in the fluid chamber 346 via the fluid port 350 and the opening 350b. The pressurized control fluid imparts a force to the second surface 360 of the first piston 342 and a force to the first surface 372 of the second piston 344 (e.g., opposing perpendicular or vertical forces in a direction along the axis 352). In particular, the force imparted by the control fluid causes the first piston 342 to move in a direction opposite the second piston 344. As shown in FIG. 3, the control fluid causes the first piston 342 to move in a direction toward the electric actuator 306 and the second piston 344 to move in direction toward the flow control member 320 in the orientation of FIG. 3. As a result, the pressurized control fluid causes the flange 378 of the stem 358 to frictionally engage the shoulder 380 of the opening 370. In this manner, the pressurized control fluid effectively provides a mechanical linkage, frictional coupling and/or connection to couple the first and second pistons 342 and 344. In other words, the control fluid causes the flange 378 of the first piston 342 to frictionally engage the shoulder 380 of the second piston 344 to operatively and/or selectively couple the first and second pistons 342 and 344.

Further, in the illustrated example, the second surface 360 of the first piston 342 has a surface area that is substantially similar or equal to a surface area of the first surface 372 of the second piston 344 such that the control fluid provides a substantially equal force to the first and second pistons 342 and 344. However, in other examples, the surface area of the first piston 342 may be different than the surface area of the second piston 344 to enable the control fluid to apply a force to the first piston 342 that is different than a force provided to the second piston 344.

Figure 5:
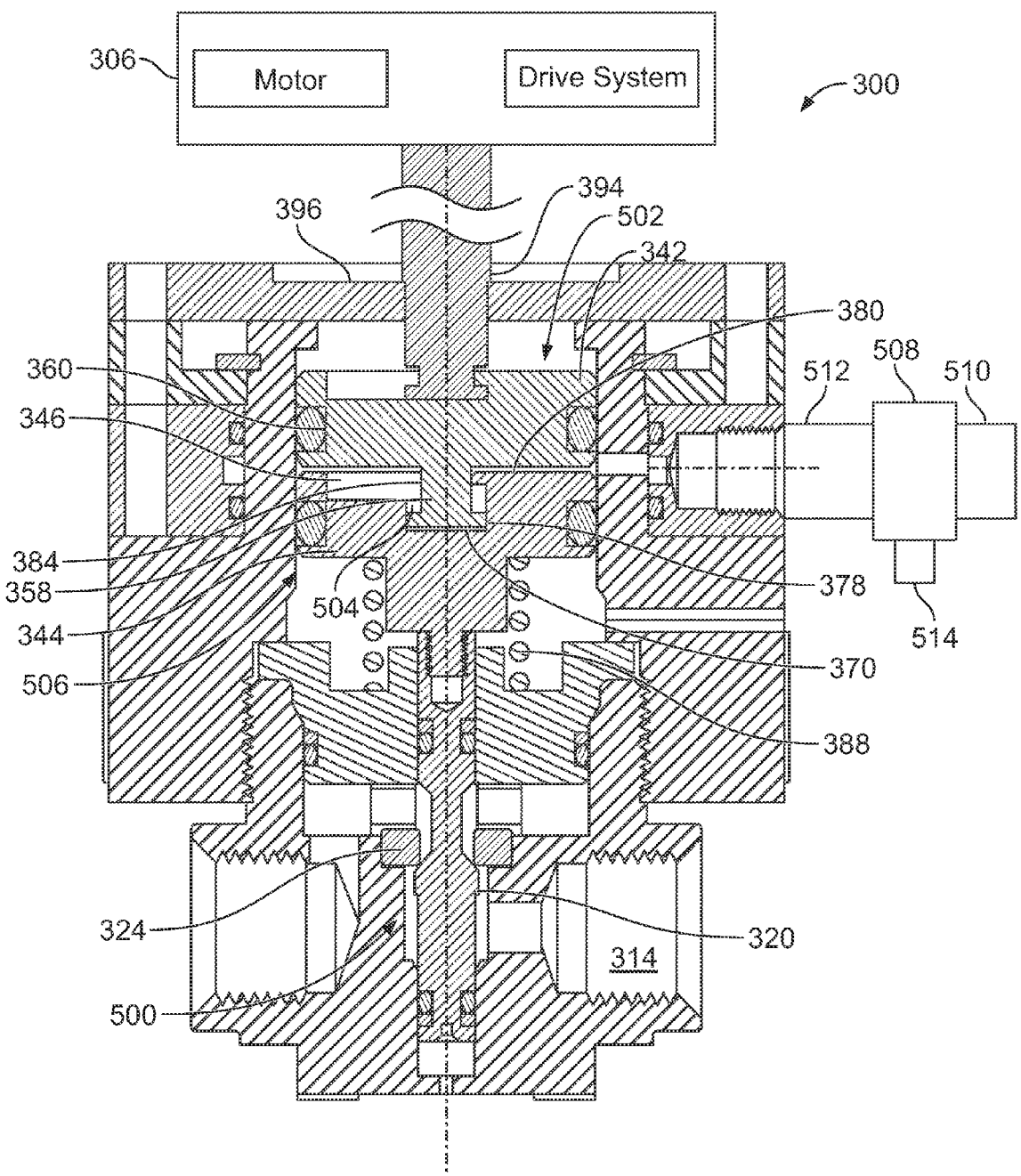
FIG. 5 is a cross-sectional view of the example fluid valve of FIGS. 3 and 4 shown in a fail position.

FIG. 3 illustrates the control valve 300 in the fully open position 326 during a non-fail condition or normal operation. A non-fail condition is provided when electric power to the electric actuator 306 is not interrupted. In FIG. 3, the electric actuator 306 is positioned at a partially open stroke position 392 to allow fluid flow through the passageway 314 between the inlet 316 and the outlet 318. The shaft 330 of the electric actuator 306 includes a shoulder, ledge or travel limit 394 to limit rectilinear travel of the stem 330 in a direction of the axis 352 when the stem 330 moves toward the valve seat 324. In other words, the travel limit 394 limits and/or defines a fully open stroke position of the electric actuator 306 when the shoulder 394 of the stem 330 engages a surface 396 of the bonnet 310 (e.g., as shown in FIG. 5).

Figure 4:
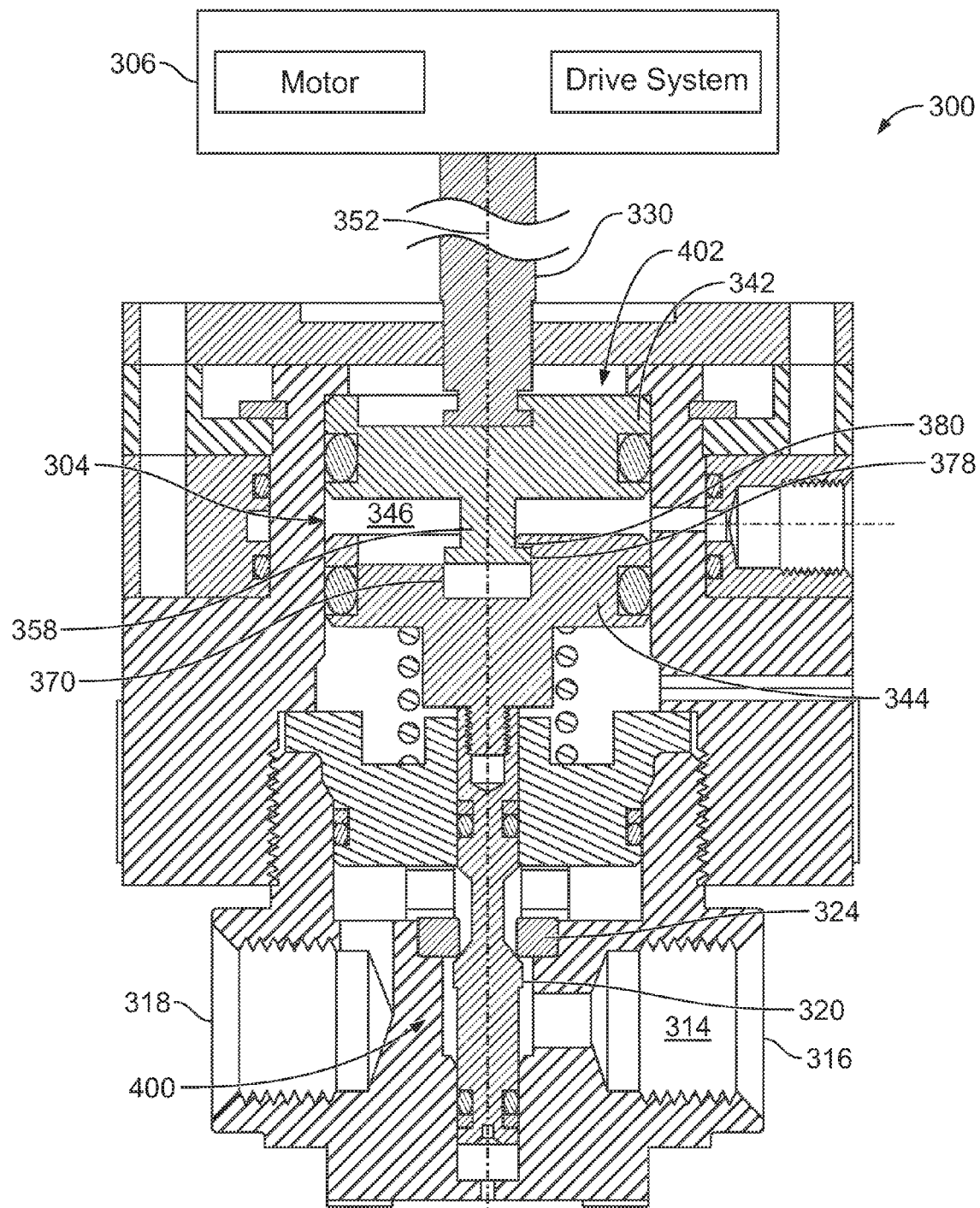
FIG. 4 is a cross-sectional view of the example fluid valve of FIG. 3 shown in a second position.

FIG. 4 illustrates the control valve 300 in a fully closed position 400 during the non-fail condition. In FIG. 4, the electric actuator 306 is positioned at a fully closed stroke position 402 to prevent fluid flow through the passageway 314 between the inlet 316 and the outlet 318. In FIG. 4, the fluid chamber 346 is provided with the control fluid, which couples the first and second pistons 342 and 344.

In operation, referring to FIGS. 3 and 4, the fluid chamber 346 is energized (e.g., provided with a pressurized control fluid) to operatively and/or selectively couple the first and second pistons 342 and 344. When a control fluid is present in the fluid chamber 346, the second piston 344 moves together with the first piston 342 when the electric actuator 306 moves between a fully open stroke position, the partially open stroke position 392 of FIG. 3, and the fully closed stroke position 402 of FIG. 4 because the control fluid causes the flange 378 of the first piston 342 to frictionally engage the shoulder 380 of the second piston 344 with a force in a direction generally parallel to the axis 352. In other words, during non-fail conditions and/or when a control fluid is otherwise provided to the fluid chamber 346, movement of the second piston 344 is dependent on the movement of the first piston 342 such that the first piston 342 and the second piston 344 move together as a unitary piston when the electric actuator 306 is actuated. As a result, when the fluid chamber 346 is energized, the flange 378 of the stem 358 remains engaged with the shoulder 380 of the opening 370 as the electric actuator 306 moves between the open stroke position (e.g., a fully open stroke position) to move the flow control member 320 away from the valve seat 324 to allow fluid flow through the passageway 314 and the closed stroke position 402 (e.g., a fully closed stroke position) to move the flow control member 320 toward the valve seat 324 to restrict or prevent fluid flow through the passageway 314. In other words, when the fluid chamber 346 is energized, the second piston 344 does not move relative to or independent from the first piston 342. The control fluid provides a pressure or force to operatively and/or selectively couple the first piston 342 and the second piston 344 such that movement of the first piston 342 via the electric actuator 306 causes the flow control member 320 to move via the second piston 344.

As noted above, the example control valve 100 of FIGS. 3 and 4 includes the fail-safe system 304. The fail-safe system 304 provides protection to a process control system by causing the flow control member 320 to move to a desired position (e.g., a closed position) during emergency situations (e.g., if electric power to the electric actuator fails). In this example, the fail-safe system 304 is an air-based fail-safe system.

FIG. 5 illustrates the control valve 300 in a closed position 500 when the fail-safe system 304 is activated during a fail condition. A fail condition may occur when electric power is not provided (e.g., is interrupted) to the electric actuator 306. In FIG. 5, the electric actuator 306 is positioned at a fully open stroke position 502. However, the flow control member 320 is engaged (e.g., sealingly engaged) with the valve seat 324 to restrict or prevent fluid flow through the passageway 314.

More specifically, in FIG. 5, the first piston 342 is operatively decoupled from the second piston 344. In particular, the control fluid is vented or removed from the fluid chamber 346, causing the mechanical linkage between the first piston 342, the second piston 344 and the biasing element 388 to decouple. In other words, the force provided to the first and second pistons 342 and 344 is removed to enable the biasing element 388 to provide a biasing force to the face 376 that is greater than a force provided to the face 372. When operatively decoupled, the second piston 344 can move relative to and independent from the first piston 342. In particular, the second piston 344 can move relative to the first piston 342 a distance defined by an upper surface 504 of the flange 378 of the stem 358 and the second surface 360 of the first piston 342 (e.g., a distance defined by a height of the annular channel 384). More specifically, the distance is sufficient to enable the travel limit 394 defined by the stem 330 to engage the upper surface 396 of the bonnet 310 and enable the flow control member 320 to sealingly engage the valve seat 324. Thus, regardless of the position of the electric actuator 306, the second piston 344 is at a zero stroke position 506 (e.g., initial position) to cause the flow control member 320 to engage the valve seat 324. The biasing element 388 biases the second piston 344 and, thus, the flow control member 320 to the closed position 500. Thus, during a fail condition and/or when the control fluid is removed from the fluid chamber 346, the electric actuator 306 is decoupled from the flow control member 320 and the biasing element 388 moves the flow control member 320 into engagement with the valve seat 324.

To operatively decouple the first and second pistons 342 and 344 during a fail condition, the control fluid in the fluid chamber 346 is vented. For example, as shown, the control valve 300 may employ a three-way solenoid valve 508 having a first port 510 to receive the control fluid from a control fluid source, a second port 512 to provide the control fluid to the fluid chamber 346, and a third port 514 to vent the fluid chamber 346. During a fail condition, electric power to the solenoid valve 508 is interrupted or removed, thereby causing the solenoid valve 508 to vent the control fluid from the fluid chamber 346 via the third port 514 as shown in FIG. 5.

Thus, a force provided by the control fluid is removed from the fluid chamber 346 to operatively decouple the first and second pistons 342 and 344 when power is not provided to the electric actuator 306 and/or the solenoid valve 508. When the first and second pistons 342 and 344 are decoupled, the shoulder 380 of the opening 370 moves away from the flange 378 of the stem 358 and the second piston 344 slides along the stem 358 via the opening 370. As a result, the second piston 344 moves or slides independent from the first piston 342 during the fail condition.

Figure 6:
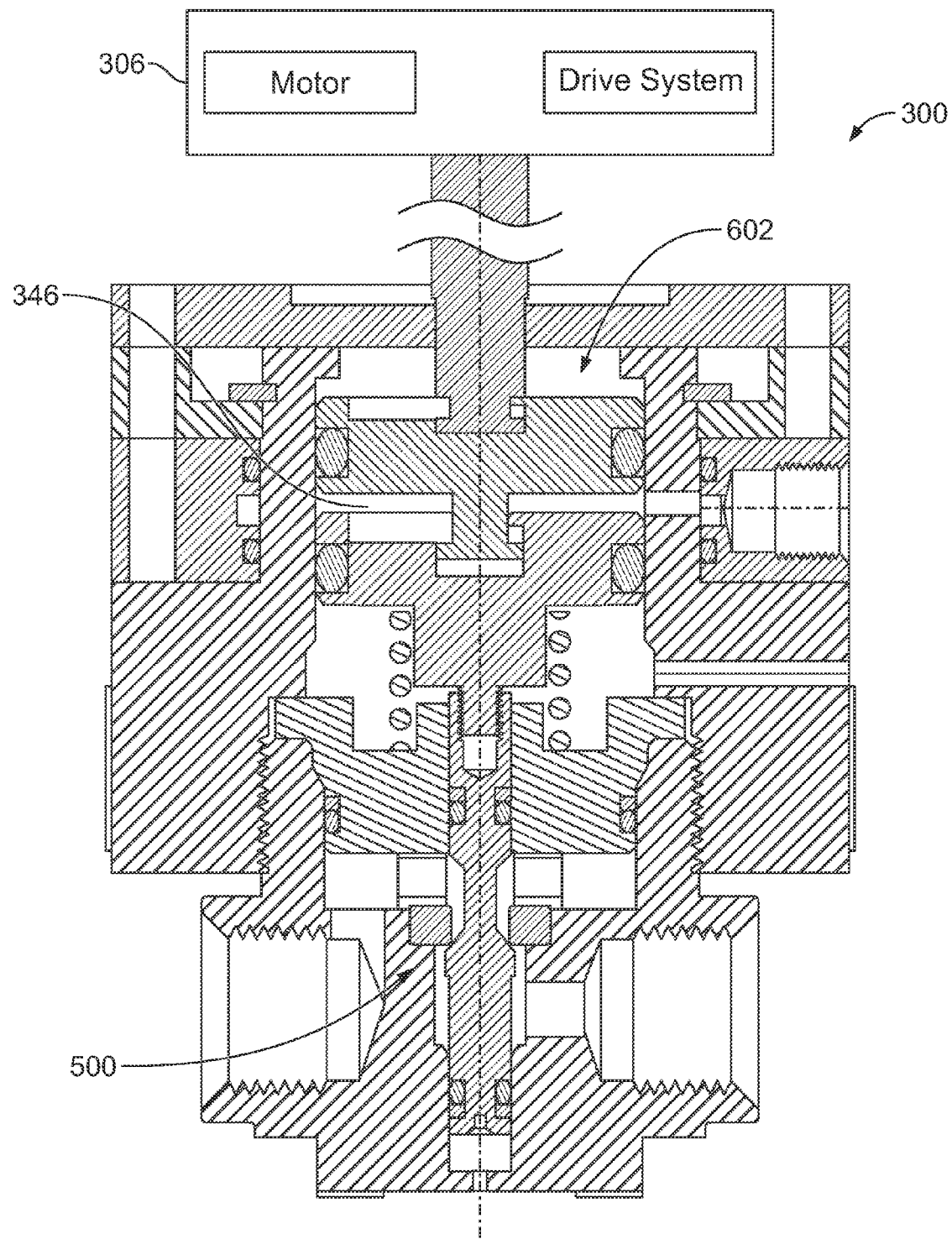
FIG. 6 is another cross-sectional view of the example fluid valve of FIGS. 3-5 shown in the fail position.

For example, FIG. 6 illustrates the control valve 300 in the closed position 500 when the control fluid is removed or vented from the fluid chamber 346 and the electric actuator 306 is positioned at a partially open stroke position 602. Although the electric actuator 306 is in the partially open stroke position 602, the control valve 300 remains in the closed position 500 because the first piston 342 is operatively decoupled from the second piston 344 and, thus, the electric actuator 306 does not affect the position of the flow control member 320 relative to the valve seat 324.

The example control valve 300 of FIGS. 3-6 is a fail-to-close valve (e.g., push-to-open). In other examples, the control valve 300 may be a fail-to-open valve (e.g., a push-to-close) valve such that in the fail condition, the fail-safe system 304 moves the valve to an open position (e.g., a fully open position).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus for use with a fluid valve comprising:
   a first piston operatively coupled to an actuator;
   a second piston movably coupled relative to the first piston, the second piston operatively coupled to a flow control member of the fluid valve; and
   a fluid chamber defined between the first and second pistons to receive a control fluid, the control fluid to operatively couple the first and second pistons when the control fluid is provided in the fluid chamber to enable the actuator to move the fluid flow control member via the first piston and the second piston between an open position and a closed position, the first piston being operatively decoupled from the second piston when the control fluid is removed from the fluid chamber to enable the second piston to operate the flow control member independently from the first piston and the actuator.

2. The apparatus of claim 1, wherein the first piston comprises a first opening formed in a first face of the first piston.

3. The apparatus of claim 2, further comprising a first stem protruding from a second face of the first piston, the first face being opposite the second face.

4. The apparatus of claim 3, wherein the second piston comprises a second opening formed in a third face of the second piston.

5. The apparatus of claim 4, further comprising a second stem protruding from a fourth face of the second piston, the third face being opposite the fourth face.

6. The apparatus of claim 4, wherein the first stem of the first piston is coupled to the second piston via the second opening.

7. The apparatus of claim 4, wherein the first stem of the first piston includes a second flanged portion to engage a second shoulder formed in the second opening of the second piston when the first piston is coupled to the second piston.

8. The apparatus of claim 2, wherein the first opening is to receive a drive stem of an electric flow controller.

9. The apparatus of claim 8, wherein the first opening has a first shoulder to engage a first flanged portion of the drive stem.

10. The apparatus of claim 1, wherein the first piston is coupled to an electric flow controller and the second piston is coupled to a flow control member.

11. The apparatus of claim 1, further comprising a biasing element to move the second piston independently from the first piston when at least some of the control fluid is removed from the chamber.

12. The apparatus of claim 1, further comprising a fluid port in fluid communication with the chamber.

13. The apparatus of claim 12, wherein the fluid port comprises an axis that is substantially perpendicular to a longitudinal axis of the first piston.

14. The apparatus of claim 12, wherein the fluid port is formed in a bonnet of the fluid valve.

15. The apparatus of claim 1, wherein the first piston has a diameter that is substantially equal to a diameter of the second piston.

16. The apparatus of claim 1, wherein the control fluid is to cause the first piston to move in a first direction and the second piston to move in a second direction opposite the first direction when the control fluid is provide in the fluid chamber.

17. An apparatus for use with a fluid valve comprising:
a piston assembly to be positioned in a bonnet of a fluid valve, the piston assembly to selectively couple an electric controller and a flow control member to control fluid flow through the fluid valve when electric power is provided to the electric controller, the piston assembly to operatively decouple the electric controller and the flow control member when electric power is not provided to the electric controller, the piston assembly comprising:
a first piston;
a second piston slidably coupled to the first piston, the first piston and the second piston to move together as a unitary piston when electric power is provided to the electric controller and the second piston is to move relative to the first piston when electric power is not provided to the electric controller; and
a fluid chamber formed between the first piston and the second piston, the fluid chamber to receive a control fluid to operatively couple the first and second pistons when electric power is provided to the electric controller to prevent movement of the first piston relative to the second piston, the control fluid to be exhausted from the fluid chamber to operatively decouple the first and second pistons to enable the first piston to move relative to the second piston when electric power to the electric controller is interrupted.

18. The apparatus of claim 17, wherein the first piston has a first face and a second face opposite the first face, the first face having a first opening to receive an actuator stem of the electric controller and the second face having a linking stem protruding from the second face.

19. The apparatus of claim 17, wherein the second piston is slidably coupled to the first piston, the second piston having a third face opposite the fourth face, the third face having a second opening to receive the linking stem of the first piston, the fourth face having a connector to operatively couple to the flow control member.

20. An apparatus for use with a fluid valve comprising:
first means for moving a flow control member of a fluid valve, the first means for moving the flow control member to couple the flow control member and an electric controller;
second means for moving the flow control member of the fluid valve independent from the first means for moving the flow control member; and
means for selectively coupling the first means for moving the flow control member and the electric controller when electric power is provided to the electric controller to prevent movement of the first means for moving the flow control member relative to the second means for moving the flow control member; and
means for selectively decoupling the first means for moving and the electric controller when electric power to the electric controller is lost, wherein the second means for moving the flow control member operates the flow control member when the first means for moving is operatively decoupled from the electric controller.

21. The apparatus of claim 20, further comprising means for biasing the second means for moving the flow control member when the first means for moving is operatively decoupled from the second means for moving.

* * * * *